Nov. 28, 1950     L. M. C. SEAMARK     2,531,922

PIPE COUPLING AND THE LIKE

Filed Feb. 5, 1946     4 Sheets-Sheet 1

Inventor.—
L.M.C. SEAMARK
by
W. E. Evans
Attorney

Nov. 28, 1950    L. M. C. SEAMARK    2,531,922
PIPE COUPLING AND THE LIKE

Filed Feb. 5, 1946    4 Sheets-Sheet 2

Inventor
L MC SEAMARK
by
W. E. Evans
Attorney.

Nov. 28, 1950     L. M. C. SEAMARK     2,531,922
PIPE COUPLING AND THE LIKE
Filed Feb. 5, 1946     4 Sheets-Sheet 3

Inventor
L.M.C.SEAMARK.
by
W. E. Evans
Attorney.

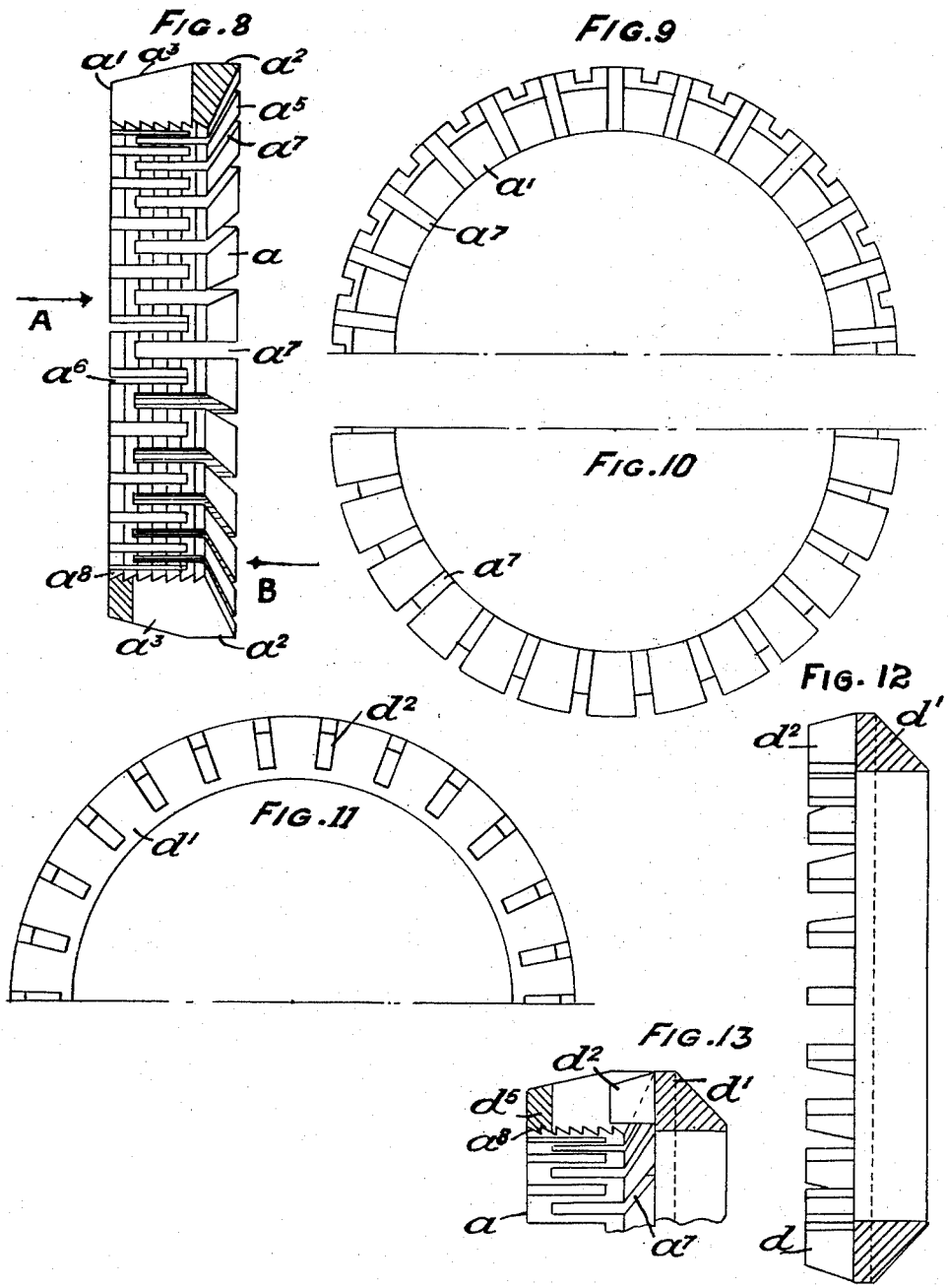

Patented Nov. 28, 1950

2,531,922

UNITED STATES PATENT OFFICE 2,531,922

PIPE COUPLING AND THE LIKE

Lewis Mervyn Cecil Seamark, Lyme Regis, England, assignor to Pidco Limited, London, England, a British company Application February 5, 1946, Serial No. 645,620
In Great Britain February 8, 1945

10 Claims. (Cl. 285—193)

The invention relates to pipe couplings in which an annular coupling or clamping member or members is or are adapted to apply pressure upon interposed packing, and at the same time to hold the respective pipe lengths, whereby a tight joint or joints is or are ensured, and the pipe lengths firmly held under the pressure imposed by bolts or other means that may be employed to maintain the coupling in the closed position.

The invention has also among its objects to avoid separation of the pipe lengths on expansion or contraction of the pipe line under varying conditions of temperature, to ensure ready assembly or separation of the parts as may be required, without any necessary special preparation of the pipe lengths being required.

According to the invention contractible metal rings are adapted on the coupling or clamping members being caused to approach each other, to be subjected to pressure for gripping the ends of the respective pipe lengths to be coupled, and to apply pressure for the compression of packing interposed upon or between the pipe lengths, the coupling or clamping members being secured together by bolts or other equivalent means adapted for the application of pressure upon the respective ends of the pipe lengths to grip the ends thereof, and to form pressure-tight packed joints upon the interposed rings of packing.

According to the invention moreover in order that the metal rings are contractible they are provided of a corrugated form, with transversely disposed radial slots in alternating series, the alternate transversely disposed slots being respectively closed and open at opposite sides. Thus alternate slots of one series are closed at one lateral face of the ring and are open at the opposite lateral face, while the slots of the second series are open at the lateral face at which the adjacent slots are closed and closed at the lateral face at which the adjacent slots are open, so that thus the external and internal peripheries of the metal rings have a zig-zag shape by reason of adjacent slots being open at opposite sides of the ring, whereby an elastic characteristic is imparted to the ring.

By such preparation of the metal rings they are adapted to be reduced in diameter under the radial pressure imposed, such as is applied by the clamping rings on the closing up of the respective radial slots. The elasticity thus imparted to the metal rings by the slots is such that the clamping rings cause the metal rings effectively to compress the packing before the metal rings are themselves compressed around the pipe sections or other elements to be coupled.

The lateral face of each metal ring may be adapted to be applied to the packing and may be undercut or inclined in direction to increase the pressure exerted upon the packing. Similarly, the form of the metal rings may be such in relation to a triangular or other advantageous cross-sectional shape of the adjacent packing ring that an effective joint with the ends of the pipe lengths or other elements is made, without the necessary use of an intermediate abutment sleeve.

The invention comprises the respective modifications in construction as hereinafter described.

The invention is illustrated in the accompanying drawings in which:

Figures 8 to 13 illustrate a modified form of contractible metal ring.

Figure 8 is a sectional elevation of the contractible metal ring.

Figure 9 is a part elevation of the ring in the direction of the arrow A (Figure 8).

Figure 10 is a part elevation in the direction of the arrow B (Figure 8).

Figure 11 is a part elevation of the packing ring adapted for application to the contractible metal ring (Figure 8).

Figure 12 is a sectional elevation of the packing ring illustrated in Figure 11.

Figure 13 is a part sectional elevation showing the packing ring mounted upon the contracible metal ring.

Figure 1:
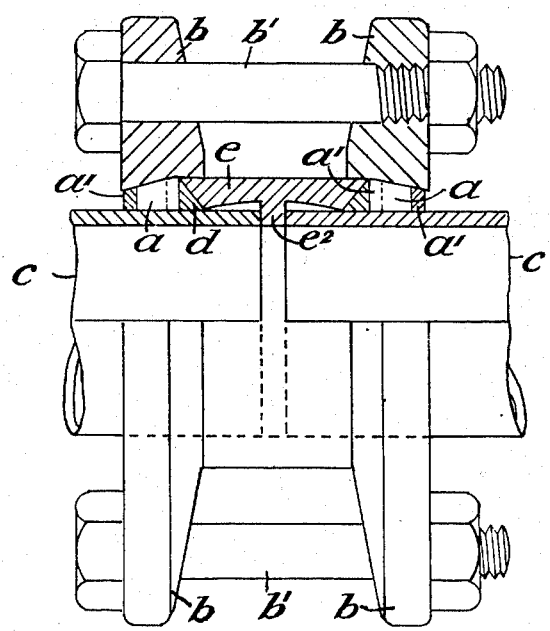
Figure 1 shows in partial longitudinal section a pipe coupling of bolted type.

In carrying the invention into effect by way of example as illustrated in Figure 1 of the accompanying drawings, the respective contractible rings $a$ are advantageously of steel and have parallel lateral faces $a^1$, $a^1$, and an internal cylindrical surface that is a sliding fit upon the ends of the respective pipe lengths $c$, $c$ to be connected, on which they are applied. The internal circumferential surface of the contractible rings $a$ has a sliding fit upon the ends of the respective pipe lengths to be connected, and may advantageously be serrated or roughened for gripping the outer peripheral surfaces of the pipe lengths to be coupled.

The outer peripheral surfaces of the contractible rings $a$ are respectively coned, whereby the deeper ends of the rings are oppositely disposed.

Figure 6:
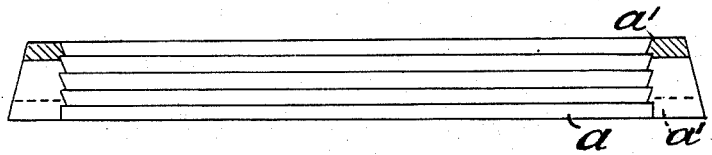
Figures 6 and 7 show a metal ring in elevation and a partial elevation in the direction indicated by the arrow B (Figure 6).
Figure 7:
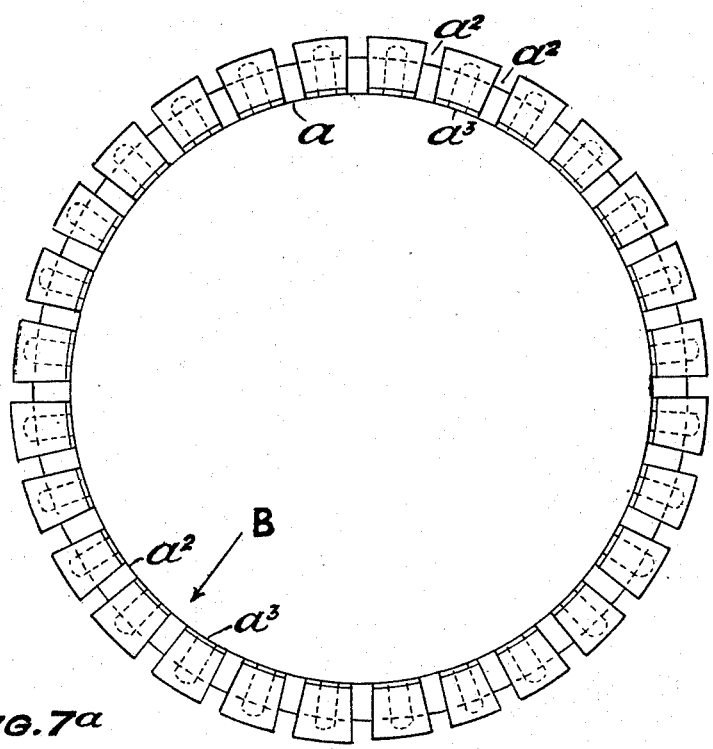
Figure 7A:
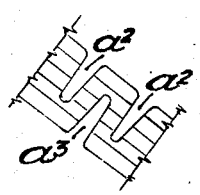
Fig. 7a is a fragmentary view of the metal ring showing the alternate slots A2 and A3.

Each lateral face of the contractible rings $a$ illustrated in detail in Figures 6 and 7 is radially slotted at equally spaced intervals circumferentially from the opposite lateral faces, and the slots $a^2$, $a^3$ thus provided are carried through the thickness of the ring alternately from the opposite lateral faces for a distance of about three-quarters of the width of the pressure ring $a$ so that thus alternate slots $a^2$, $a^3$ are open at one lateral face and are closed at the other opposite lateral face whereby the slots are advantageously provided in number such that the thickness of the metal between the slots open at the respective opposite lateral faces is approximately equal to one quarter of the thickness or width of the ring so that the thickness of the metal extending zig-zag throughout the ring is approximately uniform.

The coupling or clamping members $b$ at their inner ends are of a width greater than that of the corresponding contractible rings $a$ and are provided with an internal conical face to correspond in position with the coned outer face of the corresponding pressure rings $a$.

The outer part of the respective clamping members $b$ are bored parallel with the axis, to form a number of spaced holes for the bolts $b^1$, or alternatively the clamping members $b$ may be formed with two or more lugs that are provided with bolt holes.

An intermediate abutment sleeve $e$ of common form is conveniently disposed between the contractible rings $a$, $a$ of the two coupling or clamping members $b$ with packing rings $d$ of rubber or other packing material advantageously of triangular or circular cross-section interposed. The abutment sleeve $e$ has its end contact faces oppositely inclined or coned inwardly from the external peripheral face to the internal peripheral face and conveniently has its internal face of a concave form or reversely coned so that the pipe lengths $c$, $c$ to be coupled need not necessarily be in true alignment. Midway in the length of the abutment sleeve $e$ there may be provided an integral inwardly directed flange $e^2$ that may be positioned between the ends of the pipe lengths $c$, and thus determine the disposition of the sleeve $e$ with reference to the adjacent pipe lengths to be connected.

In the use of the coupling illustrated in Figure 1, the clamping members $b$ and contractible rings $a$ are first passed over the ends of the corresponding pipe lengths $c$, $c$. A packing ring $d$ is also passed over each pipe length between the pressure ring $a$ and the abutment sleeve $e$. The abutment sleeve $e$ is then positioned upon the end of one of the pipe lengths, and the other pipe length is moved into position so that its end may enter the abutment sleeve $e$ and abut against the flange $e^2$. The contractible metal rings $a$ are then brought up into proximity with the respective ends of the abutment sleeve $e$ so as to confine the packing rings $d$, and the clamping members $b$ are then mounted upon the metal rings $a$ and connected by the clamping bolts $b^1$. On the tightening of the bolts $b^1$ the clamping members $b$ are drawn together and as they approach they carry the respective metal rings $a$ with them so that pressure is thus applied to the packing rings $d$ to bring them into close contact with the inclined end faces of the abutment sleeve $e$. As the clamping members $b$ continue to move inward as the bolts $b^1$ are tightened, the clamping members $b$, $b$ ride over the respective metal rings $a$ and compress them to close the numerous transverse slots within the metal rings $a$ and reduce the diameter of the rings $a$, $a$ until the rings firmly grip the external surface of the pipe lengths $c$, $c$ near the ends.

It will be understood that the abutment sleeve $e$ may be omitted if the packing $d$ is provided of a suitable form such as a packing ring of triangular cross-section, that may be compressed between the correspondingly-inclined lateral faces of the metal rings $a$.

Figures 2, 3:
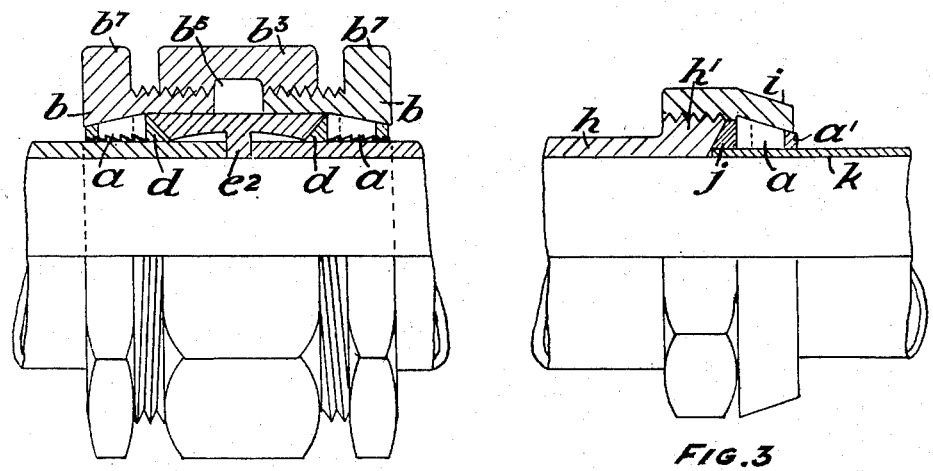
Figure 2 shows in partial longitudinal section a pipe coupling of union type.
Figure 3 shows in partial longitudinal section a pipe coupling adapted for the connection of copper tubing to the end of a pipe line.

In carrying the invention into effect as illustrated in Figure 2, the coupling or clamping members $b$, $b$ are substantially the same as illustrated in Figure 1, except that the coupling or clamping members $b$, $b$ (Figure 1) are provided as externally screw-threaded sleeves respectively having right hand and left hand threads, for the engagement of a centrally disposed surrounding sleeve $b^3$ having internally screw-threaded ends respectively having right and left hand threads corresponding with the external right and left hand threads of the externally screw-threaded sleeves $b$, $b$.

The externally screw-threaded sleeves $b$, $b$ (Figure 2) have at their respective outer ends an integral flange $b^7$ of such width that the external periphery of the flanges $b^7$ may be formed with external hexagonal faces whereby the externally screw-threaded sleeves $b$, $b$ may be conveniently engaged by a tool for their adjustment into the positions necessary to apply pressure upon the interposed packing rings $d$ of triangular or other cross-section, and to compress and deform the respective metal rings $a$, provision being made by an internal central cavity $b^5$ in which the inner ends of the externally screw-threaded sleeves $b^7$ are accommodated, as they move inward to apply such pressure as to deform the metal rings $a$ to ensure a pressure-tight joint.

In carrying the invention into effect as illustrated in Figure 3, the compressible metal ring $a$ is employed for the connection of tubing $k$ for example of light copper directly to the end of a pipe line $h$. For this purpose the enlarged end $h^1$ of a length of the pipe line $h$ is screw-threaded externally for the reception of the internally screw-threaded end of a clamping sleeve $i$ one end of which is of a forwardly tapering conical form, the conical face of the cone at the front end conforming to the angle to the outer face of the metal ring $a$ such as hereinbefore described with reference to Figures 6 and 7 of the accompanying drawings; the metal ring $a$ being serrated or roughened at its internal surface for the purpose effectively to grip the end of the copper tubing $k$, and a packing ring $j$ is interposed between the inclined end face of the enlarged end of the pipe line $h$ and the end of the metal ring $a$; and the packing ring $j$ is supported at the end of the copper tubing $k$. The rear part of the clamping sleeve $i$ is advantageously provided externally hexagonal whereby the sleeve $i$ may be conveniently engaged. By such means the clamping sleeve $i$ is adapted conviently to be rotated for applying pressure to the packing ring $j$ and for compressing the metal ring $a$ for gripping the end of the tubing $k$.

Figure 4:
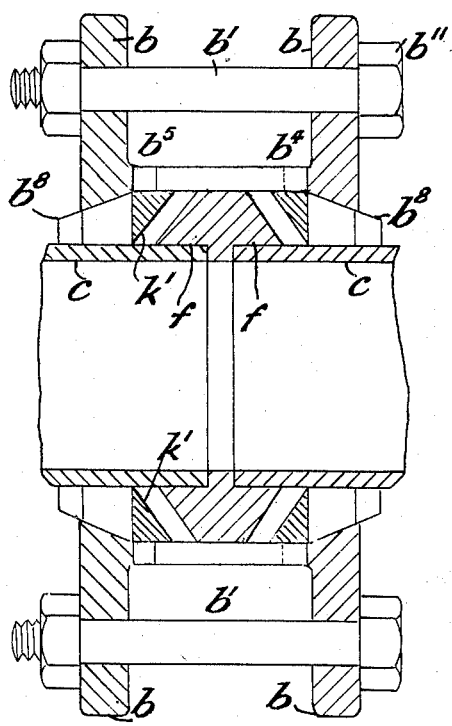
Figures 4 and 5 show in end elevation and partial longitudinal cross-section a pipe coupling adapted to maintain a tight joint between the ends of the pipe lengths connected and firmly to grip the pipe lengths.
Figure 5:
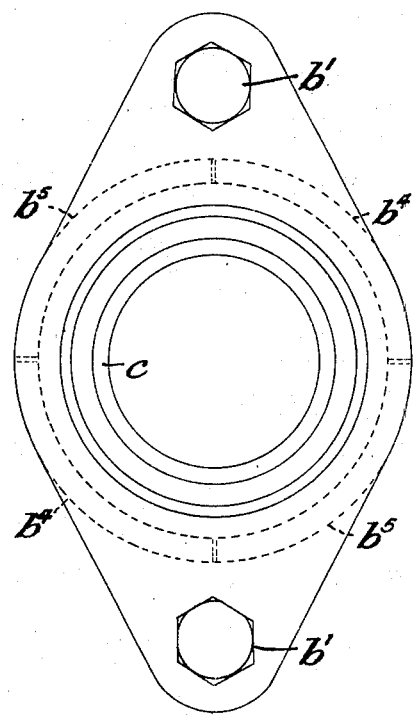

In carrying the invention into effect as illustrated in the construction in Figures 4 and 5, the coupling or clamping members $b$, $b$ are connected together at spaced intervals by bolts $b^1$ as in the construction illustrated in Figure 1. The coupling or clamping members $b$, $b$ are respectively provided with integral quarter segments $b^4$, $b^5$, $b^4$, $b^5$, the alternate segments being integrally formed in oppositely disposed pairs with the respective coupling or clamping members $b$, $b$.

The underfaces of the respective coupling or clamping members $b$ incline inward at each side at $b^8$ to contact respectively the top face of the contractible metal rings $a$ beneath, the outer faces of which incline inward near their outer ends, whereby on the coupling or clamping members $b$, $b$ being drawn together on the rotation of the nuts $b^{11}$, the contractible metal rings $l$ approach each other and contact the packing rings $f$ of arrow head cross-section at the outer ends of the tubes $c$, $c$ to be connected, whereby the respective coned internal faces $k^1$ come into contact with the inclined external faces of the packing rings $f$, and the ends of the pipe lengths $c$, $c$ are gripped, the ends of the pipe lengths approaching each other whereby the packing ring $f$ is compressed as the inclined inner faces $k^1$ move inward, whereby a tight joint is made and the ends of the pipe lengths $c$ firmly gripped in position.

As illustrated in Figures 8 to 13, the metal ring $a$ is provided at $a^3$ with an external conical periphery integral with the part $a^2$ having a cylindrical periphery, and an inwardly inclined front face $a^5$. The metal ring $a$ (Figure 8) is provided with a series of slots $a^6$ open at the outer face $a^1$ of the ring cross-section, the slots $a^6$ extending short of the opposite inclined face $a^5$, while a series of radial slots $a^7$ extend from the inner side short of the outer side $a^1$ on the ring. The internal peripheral face of the ring $a^8$ is roughened or serrated for effectively gripping the circumferential face of the pipe lengths. A packing ring $d^1$ advantageously formed of rubber or incorporating rubber and of a substantially triangular cross-section is mounted upon the ring $a$ by means of outwardly extending projecting parts $d^2$ that have such a thickness as to be inserted into the corresponding series of radial slots $a^7$ in the position indicated in Figure 13. By such means the packing ring $d^1$ is formed as a unit with the contractible metal ring $a$ and is adapted to be inserted within an annular cavity beneath the coupling or clamping members $b$ of the pipe coupling with the packing ring $d^1$ innermost.

In Figure 5 the metal rings are in their partially closed position, and in the completion of their inward movement their front faces $k^1$ tightly contact the outer inclined faces of the packing $f$ and make a tight joint.

I claim:

1. A pipe coupling, comprising contractible metal rings, each ring having an internal cylindrical face and an external conical face, a circular series of transversely disposed radial slots extending across the said ring from one end face of the ring to a position short of the opposite end face, packing interposed upon or between the pipe lengths, and means for the application of pressure on the ring to cause the ends of the pipe length to be gripped by the contractible metal ring and pressure-tight joints to be formed at the interposed ring of packing.

2. A pipe coupling comprising contractible metal rings, each ring having an internal cylindrical face and an external conical face, a circular series of transversely disposed radial slots extending across the ring from one end face of the ring to a position short of the opposite end adjacent slots being respectively open and closed at opposite ends, packing interposed upon or between the pipe lengths, and means for the application of pressure on the ring to cause the ends of the pipes to be gripped by the contractible metal ring and pressure-tight joints to be formed at the interposed ring of packing.

3. A pipe coupling comprising contractible metal rings, each ring having an internal cylindrical face and an external conical face, a circular series of transversely disposed radial slots extending across the ring from one end face of the ring to a position short of the opposite end face, an intermediate abutment sleeve disposed between the contractible metal rings, rings of packing interposed upon or between the inner faces of the contractible metal rings, and the conically formed outer end faces of the intermediate abutment sleeve and clamping means consisting of rings having an inner periphery at the outer end formed to a conical shape to engage the outer faces of the contractible metal ring with close fit, a series of transversely extending bolts mounted to pass through holes provided in the rings, nuts screwed onto the ends of the bolts, and adapted to apply a pressure on the contractible metal rings, the intermediate abutment sleeve and the rings of packing.

4. A pipe coupling comprising contractible metal rings, each ring having an internal cylindrical face and an external conical face, a circular series of transversely disposed radial slots extending across the ring from one end face of the ring to a position short of the opposite end face, an intermediate abutment sleeve disposed between the contractible rings of packing interposed upon or between the inner faces of the contractible metal rings and the conically formed outer end faces of the intermediate abutment sleeve and clamping means consisting of sleeves having an inner periphery at the outer end formed to a conical shape, left and right hand screw threads formed respectively on the outer peripheries of the sleeves and a clamping member formed as a rotatable annulus having internally screw-threaded ends respectively with left-hand and right-hand screw threads, to engage the corresponding threads on the said sleeves.

5. A pipe coupling comprising a contractible metal ring having an internal cylindrical face and an external conical face, a circular series of transversely disposed radial slots extending across the said ring from one end face of the ring to a position short of the opposite end face, packing interposed on the outer periphery of one first length of pipe and between the end face of a second length of pipe and the inner end face of the contractible metal ring, screw threads formed at the end on the outer periphery of said second length of pipe and a rotatable clamping sleeve formed at one end with internal screw threads to engage the screw threads on said second length of pipe and with an internal conical periphery at the other end to engage with close fit the outer conical periphery of the contractible metal ring.

6. A pipe coupling comprising contractible metal rings, each ring having an internal cylindrical face and an external conical face, a circular series of transversely disposed radial slots extending across the ring from one end face of the ring to a position short of the opposite end face, an intermediate abutment sleeve disposed between the contractible metal rings, rings of packing interposed upon or between the inner faces of the contractible metal rings and the conically formed outer end faces of the intermediate abutment sleeve and clamping means consisting of flanged annular sleeves with integral quarter segments, alternate segments being integrally formed in oppositely disposed pairs with the said annular sleeves, bolts passing through the flanges of said sleeves and into screw threads on the ends of said bolts to cause pressure to be applied on the contractible rings, the intermediate abutment sleeve and the rings of packing.

7. A pipe coupling including one or more contractible metal rings, each ring having a part formed with an external conical periphery and a part with a cylindrical periphery, and an inwardly inclined front face, a circular series of transversely disposed radial slots extending across the said ring from one end face of the ring to a position short of the opposite end face, packing interposed upon or between the pipe lengths, and means for the application of pressure on the ring to cause the ends of the pipe lengths to be gripped by the contractible metal ring and pressure-tight joints to be formed at the interposed ring of packing.

8. A pipe coupling comprising one or more contractible metal rings, each ring having an internal cylindrical face with teeth or serrations on said face, and an external conical face, a circular series of transversely disposed radial slots extending across the said ring from one end face of the ring to a position short of the opposite end face, packing interposed upon or between the pipe lengths, and means for the application of pressure on the ring to cause the ends of the pipe lengths to be gripped by the contractible metal ring and pressure-tight joints to be formed at the interposed ring of packing.

9. A pipe coupling comprising one or more contractible metal rings, each ring having an internal cylindrical face and an external conical face, a circular series of transversely disposed radial slots extending across the said ring from one end face of the ring to a position short of the opposite end face, a packing ring of rubber or rubber-like substance of substantially triangular cross-section mounted on said ring with outwardly extending projecting parts engaging with close fit in the corresponding series of radial slots open on the inner face of the ring to form a unit with said contractible ring, and means for the application of pressure on said ring to cause the ends of the pipe lengths to be gripped by said ring and pressure-tight joints to be formed at the interposed ring of packing.

10. A pipe coupling comprising one or more contractible metal rings, each ring having an internal cylindrical face and an external conical face, teeth or serrations on said internal cylindrical face, a circular series of transversely disposed radial slots extending across the said ring from one end face of the ring to a position short of the opposite end face, a packing ring of rubber or rubber-like substance of substantially triangular cross-section mounted on said ring with outwardly extending projecting parts engaging with close fit in the corresponding series of radial slots open on the inner face of the ring to form a unit with said contractible ring, and means for the application of pressure on said ring to cause the ends of the pipe lengths to be gripped by said ring and pressure-tight joints to be formed at the interposed ring of packing.

LEWIS MERVYN CECIL SEAMARK.

REFERENCES CITED

The following references are of record in the file of this patent:

UNITED STATES PATENTS

| Number | Name | Date |
|---|---|---|
| 2,017,994 | Spang | Oct. 22, 1935 |
| 2,318,575 | Armington | May 11, 1943 |
| 2,358,299 | Benjamin | Sept. 19, 1944 |

FOREIGN PATENTS

| Number | Country | Date |
|---|---|---|
| 392,287 | Great Britain | May 18, 1933 |